US012305584B2

(12) United States Patent
Petterson et al.

(10) Patent No.: US 12,305,584 B2
(45) **Date of Patent: *May 20, 2025**

(54) SYSTEM FOR REMOTELY MONITORING AND CONTROLLING OPERATION OF A HYDRO-DIESEL ENGINE

(71) Applicant: H2DIESEL, INC., Lewes, DE (US)

(72) Inventors: John S. Petterson, La Jolla, CA (US); John L. Haller, La Jolla, CA (US)

(73) Assignee: H2DIESEL, INC., Lewes, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 18/894,704

(22) Filed: Sep. 24, 2024

(65) Prior Publication Data

US 2025/0012224 A1 Jan. 9, 2025

Related U.S. Application Data

(63) Continuation of application No. 18/592,913, filed on Mar. 1, 2024, now Pat. No. 12,134,990.

(Continued)

(51) Int. Cl.
*F02D 19/08* (2006.01)
*F02D 19/06* (2006.01)

(52) U.S. Cl.
CPC ....... *F02D 19/081* (2013.01); *F02D 19/0623* (2013.01); *F02D 19/0628* (2013.01);
(Continued)

(58) Field of Classification Search
CPC ............... F02D 19/081; F02D 19/0623; F02D 19/0628; F02D 19/0644; F02D 19/0671;
(Continued)

(56) References Cited

U.S. PATENT DOCUMENTS 4,259,021 A 3/1981 Goudy, Jr.
4,334,889 A 6/1982 Takabayashi
(Continued)

FOREIGN PATENT DOCUMENTS

CN 110240953 A 9/2019
DE 102013003982 A1 9/2014
(Continued)

OTHER PUBLICATIONS

United States International Searching Authority, International Search Report and Written Opinion for corresponding International Application No. PCT/US2023/035695, mailed Feb. 7, 2024, 12 pages.

(Continued)

*Primary Examiner* — Sizo B Vilakazi
(74) *Attorney, Agent, or Firm* — David R. Heckadon; Gordon Rees Scully Mansukhani LLP

(57) ABSTRACT

A system for remotely monitoring and controlling operation of a hydro-diesel engine, having: (a) a diesel engine assembly; (b) a hydro-diesel assembly connected to the diesel engine assembly; (c) a remote control system; and (d) a remote computer system in communication with the remote control system, wherein the remote computer system is configured to instruct the remote control system to turn off operation of either: (i) the hydro-diesel assembly while permitting the diesel engine assembly to continue operation while the hydro-diesel assembly is not operating, or (ii) both the hydro-diesel assembly and the diesel engine assembly.

20 Claims, 2 Drawing Sheets

Related U.S. Application Data

(60) Provisional application No. 63/451,728, filed on Mar. 13, 2023.

(52) U.S. Cl.
CPC ..... *F02D 19/0644* (2013.01); *F02D 19/0671* (2013.01); *F02D 19/0678* (2013.01); *F02D 19/0681* (2013.01)

(58) Field of Classification Search
CPC ............. F02D 19/0678; F02D 19/0681; F02D 41/021; F02D 19/082; F02D 19/12; F02D 41/0025
See application file for complete search history.

(56) References Cited

U.S. PATENT DOCUMENTS

| | | | | |
|---|---|---|---|---|
| 4,388,893 | A | 6/1983 | Apfel | |
| 4,742,810 | A * | 5/1988 | Anders | F02M 27/08 123/538 |
| 6,164,813 | A | 12/2000 | Wang | |
| 6,205,981 | B1 | 3/2001 | Lorraine | |
| 6,207,064 | B1 | 3/2001 | Gargas | |
| 6,478,857 | B2 | 11/2002 | Czabala | |
| 6,606,855 | B1 | 8/2003 | Kong et al. | |
| 6,641,625 | B1 | 11/2003 | Clawson et al. | |
| 6,804,950 | B2 | 10/2004 | Kong et al. | |
| 6,988,033 | B1 | 1/2006 | Lowrey et al. | |
| 7,377,272 | B2 | 5/2008 | Davidson | |
| 7,430,991 | B2 | 10/2008 | VanHoose et al. | |
| 7,621,260 | B2 | 11/2009 | Mitani et al. | |
| 7,715,961 | B1 | 5/2010 | Kargupta | |
| 7,789,047 | B2 | 9/2010 | Kuroki et al. | |
| 7,841,762 | B2 * | 11/2010 | Oogawara | F02M 25/0225 366/127 |
| 7,861,696 | B2 | 1/2011 | Lund | |
| 7,882,789 | B2 | 2/2011 | Kumar et al. | |
| 7,946,258 | B2 | 5/2011 | Adams et al. | |
| 8,176,884 | B2 | 5/2012 | Tewari et al. | |
| 8,333,171 | B2 | 12/2012 | Lund | |
| 8,377,180 | B2 | 2/2013 | Maeda et al. | |
| 8,478,514 | B2 | 7/2013 | Kargupta | |
| 8,544,452 | B1 | 10/2013 | Galvin et al. | |
| RE45,413 | E | 3/2015 | Lund | |
| 9,388,749 | B2 | 7/2016 | MacDonald | |
| 9,527,046 | B1 | 12/2016 | Roe | |
| 9,586,186 | B2 | 3/2017 | Roe | |
| 9,638,136 | B2 | 5/2017 | Jung | |
| 9,884,162 | B2 | 2/2018 | Kobayashi et al. | |
| 9,945,299 | B2 | 4/2018 | Lund | |
| 10,080,998 | B2 | 9/2018 | Roe et al. | |
| 10,280,877 | B2 | 5/2019 | Hamad et al. | |
| 10,486,114 | B2 | 11/2019 | Roe | |
| 10,494,992 | B2 | 12/2019 | Johnson et al. | |
| 10,527,013 | B2 * | 1/2020 | St. Mary | F02M 37/0064 |
| 10,605,162 | B2 | 3/2020 | Johnson et al. | |
| 10,746,094 | B2 | 8/2020 | Johnson et al. | |
| 10,815,123 | B2 | 10/2020 | Northrop | |
| 10,920,717 | B1 | 2/2021 | Owens | |
| 11,239,479 | B2 | 2/2022 | Katikaneni et al. | |
| 11,247,014 | B2 | 2/2022 | Koizumi et al. | |
| 11,598,276 | B1 | 3/2023 | Klingbeil et al. | |
| 12,134,990 | B2 * | 11/2024 | Petterson | F02D 19/0671 |
| 2002/0127445 | A1 | 9/2002 | Carpenter et al. | |
| 2004/0101795 | A1 | 5/2004 | Fairfull | |
| 2006/0288869 | A1 | 12/2006 | Warren et al. | |
| 2007/0020568 | A1 | 1/2007 | Finley | |
| 2007/0033929 | A1 | 2/2007 | Telford et al. | |
| 2008/0223332 | A1 | 9/2008 | Maro et al. | |
| 2008/0223344 | A1 | 9/2008 | Suzuki et al. | |
| 2008/0245318 | A1 | 10/2008 | Kuroki et al. | |
| 2009/0012698 | A1 | 1/2009 | Shinagawa et al. | |
| 2010/0228415 | A1 | 9/2010 | Paul | |
| 2010/0294994 | A1 | 11/2010 | Basini et al. | |
| 2011/0023853 | A1 | 2/2011 | Lund | |
| 2011/0061622 | A1 | 3/2011 | Lund | |
| 2012/0037098 | A1 | 2/2012 | Wey | |
| 2012/0186560 | A1 | 7/2012 | Lund | |
| 2013/0175201 | A1 * | 7/2013 | Cajiga | E04H 1/1233 29/469 |
| 2013/0269243 | A1 | 10/2013 | Lund | |
| 2015/0081199 | A1 * | 3/2015 | Chauncey | B60K 35/60 701/123 |
| 2015/0114351 | A1 | 4/2015 | Lund | |
| 2015/0136047 | A1 | 5/2015 | Hou | |
| 2015/0226113 | A1 | 8/2015 | Alexander et al. | |
| 2016/0362114 | A1 * | 12/2016 | Chauncey | B60K 35/00 |
| 2019/0085802 | A1 | 3/2019 | St. Mary et al. | |
| 2019/0145327 | A1 | 5/2019 | Gieger et al. | |
| 2020/0061549 | A1 | 2/2020 | Roe | |
| 2021/0101110 | A1 | 4/2021 | Rheaume et al. | |
| 2021/0131361 | A1 | 5/2021 | Turner et al. | |
| 2022/0325684 | A1 | 10/2022 | Lawhorn | |
| 2023/0268538 | A1 | 8/2023 | Wiekamp | |
| 2023/0340919 | A1 * | 10/2023 | Mercal | F02B 75/047 |
| 2023/0417198 | A1 | 12/2023 | Lund | |

FOREIGN PATENT DOCUMENTS

| | | | |
|---|---|---|---|
| DE | 102029213283 | A1 | 3/2021 |
| EP | 1883750 | B1 | 2/2008 |
| WO | 2006126341 | A2 | 11/2006 |
| WO | 2007062217 | A2 | 5/2007 |
| WO | 2008125976 | A2 | 10/2008 |
| WO | 2014039663 | A2 | 3/2014 |
| WO | 2017004551 | A1 | 1/2017 |
| WO | 2017205681 | A1 | 11/2017 |
| WO | 2022096718 | A1 | 5/2022 |
| WO | 2023154174 | A1 | 8/2023 |
| WO | 2024091443 | A1 | 5/2024 |

OTHER PUBLICATIONS

United States International Searching Authority, International Search Report and Written Opinion for corresponding International Application No. PCT/US2023/037208, mailed Feb. 22, 2024, 10 pages.
Green Car Congress, Hydrogen-Enhanced Combustion Engine Could Improve Gasoline Fuel Economy by 20% to 30%, Nov. 5, 2005, https://www.greencarcongress.com/2005/11/hydrogenenhance.html, 2 pages.
Lee et al., Plasma Assisted Hydrogen Generation: A Mechanistic Review, Fuel Processing Technology 247 (2023) 107761, 16 pages.
United States International Searching Authority, International Search Report and Written Opinion for corresponding International Application No. PCT/US2023/081154, mailed Mar. 28, 2024, 12 pages.
United States International Searching Authority, International Search Report and Written Opinion for corresponding International Application No. PCT/US2023/081152, mailed Apr. 29, 2024, 13 pages.
NissanConnect Services Remote Engine Start/Stop, Nissan, 2022, 4 pages, https://web.archive.org/web/20221203160155/https://www.nissanusa.com/connect/features-apps/remote-engine-start.html.
United States International Searching Authority, Invitation to Pay Additional Fees for corresponding International Application No. PCT/US2024/017795, mailed May 30, 2024, 2 pages.
United States International Searching Authority, International Search Report and Written Opinion for corresponding International Application No. PCT/US2024/017795, mailed Aug. 7, 2024, 15 pages.

* cited by examiner

SYSTEM FOR REMOTELY MONITORING AND CONTROLLING OPERATION OF A HYDRO-DIESEL ENGINE

RELATED APPLICATIONS

This is a Continuation of U.S. patent application Ser. No. 18/592,913, of same title, filed Mar. 1, 2024, which claims priority to U.S. Provisional Patent Application Ser. No. 63/451,728, of same title, filed Mar. 13, 2023, the entire disclosures of which are incorporated by reference herein in their entirety for all purposes.

TECHNICAL FIELD

The present invention relates to hydro-diesel engines and to systems for monitoring and remotely controlling the operation of such engines. The present invention also relates to systems for shutting down a hydro-diesel system's operation when various monitored engine parameters either indicate that system operation has become unsafe or that various financial requirements of operating such hydro-diesel systems have not been met. In addition, the present invention relates to remote systems for both tracking hydro-diesel engine operation and for remotely modifying or adjusting hydro-diesel engine operation.

BACKGROUND OF THE INVENTION

A conventional four cycle gasoline engine operates on a mixture of air and gasoline fuel which is combined by a carburetor, and received into the combustion chamber as the piston recedes, moves downwardly (the "intake cycle"). The combustion exhaust gases are later expelled from the combustion chamber after combustion has occurred as the piston moves upwards (the "exhaust cycle"). Prior to exhaust cycle, the air/fuel mixture that is brought into the combustion chamber heats up as the piston moves upwards (the "compression cycle") thereby compressing the air. At or near top dead center of the piston's compression cycle, a spark is generated by a spark plug that is controlled by the distributor. The spark ignites the air/fuel mixture in the combustion chamber, forcing the piston back downward (the "power cycle"). When the piston moves upwards again the exhaust valve opens thereby expelling the exhaust gasses as the exhaust cycle is repeated. These cycles repeat continuously.

Operation of a conventional diesel engine is similar to that of the standard gasoline engine described above. Specifically, a four cycle diesel engine brings air into the combustion chamber as the piston moves downwards (the "intake cycle"). As the piston moves back upwards it compresses the air (the "compression cycle") which causes the air to increase in temperature. At or near top dead center of the piston's travel, diesel fuel is injected under high-pressure into the combustion chamber. The diesel fuel spontaneously ignites due to the heat of the compressed air. This combustion forces the piston downwards (the "power cycle"). As the piston moves back upwards (the "exhaust cycle") the exhaust valve opens expelling the exhaust gases.

In both the cases of the standard gasoline engine and the standard diesel engine, the air that is brought into the combustion chamber is ambient air that consists of about 24% oxygen and 75% nitrogen. During combustion, the nitrogen within the air reacts with the oxygen to form nitrous oxides. Unfortunately, nitrous oxides are an undesirable pollutant which prior to this invention are always produced by the operation of a standard internal combustion engines.

An example of a hydro-diesel engine system is found in U.S. Publication 2023/0417198, entitled "Constant Pressure Fuel Enhancement And Method", incorporated herein by reference in its entirety for all purposes. This system uses an infuser and is specifically directed to providing a preferred ratio of gas (e.g.: $H_2$) to liquid in a constant pressure fuel mixture. The system also uses an injector which may be mechanically or electrically controlled. In this system, only part of the fuel applied to the injector is actually injected into the combustion chamber (in accordance with the engine load). The remainder of the fuel flows out of the injector and is returned to the infuser. This return fuel is used to cool the injector. Unfortunately, the fuel can cause problems like cavitation, undesirable pressure fluctuations and unstable engine operation. Therefore, this system must be operated at a sufficiently high pressure to prevent large gas bubble formation. The pump system (which involves variable speed pumps) and the control system work together to maintain the desired high pressures.

As stated above, hydro-diesel engines offer increased combustion efficiencies by having small bubbles of hydrogen gas evenly (i.e.: homogeneously) distributed throughout the liquid fuel, resulting in a more uniform and efficient burn in the combustion chamber. The economic benefits to purchasers of these hydro-diesel systems is huge. Basically, every minute a customer/operator is using a hydro-diesel system, they are saving money. Therefore, it would be desirable for the company or entity that is providing the hydro-diesel components in the engine system both to benefit economically from its operation, and to maintain optimal operational parameters when the system is operating. As will be shown, the present system can meet these objectives by providing a system that remotely monitors and adjusts operation of a hydro-diesel system. The present system can even shut down operation of the hydro-diesel components of the system when they are operating outside desired safety parameters or when the vehicle operator stops paying for use of such hydro-diesel systems.

SUMMARY OF THE INVENTION

The present invention provides a system that remotely monitors and adjusts the operation of a hydro-diesel engine. In preferred aspects, the present system is enabled to turn on or off the hydro-diesel portion of a the engine while the diesel portion of the engine remains operational. As such, the present system can be operated either as a standard diesel engine or be remotely switched into operating as a hydro-diesel engine (i.e.: with hydrogen gas being homogeneously mixed into the liquid diesel fuel to increase its combustion efficiency).

As such, the present invention is directed to a hydro-diesel engine that provides a substantial improvement in efficiency and reduction of noxious greenhouse gases over that generated by a conventional diesel engine using conventional diesel fuel. Except for the infuser and the hydro-diesel fuel mixture, the operation of the hydro-diesel engine is similar to that of a conventional diesel engine. The conventional source of the hydrogen gas in the hydro-diesel engine can be supplied from a pressurized hydrogen tank or from a water hydrolysis device. Alternative embodiments of the present hydro-diesel engine also include mixing hydrogen gas with other gaseous fuels and/or oxidizer to the diesel fuel. In other alternative embodiments of the present hydro-diesel engine, oxygen may be added to further augment the mixture of diesel fuel and hydrogen. Air is injected into the combustion chamber through the air intake. The hydro-diesel fuel mixture is injected into the chamber as the piston raises to TDC. The present hydro-diesel engine provides a more complete combustion of the fuel (as compared to a standard diesel engine) by using and injecting hydrogen into the diesel fuel to provide a more efficient combustion of upwards of 30%.

In various aspects, the operational parameters of the engine that are monitored by the present system can be transmitted to a remote computer system. Optionally, the remote computer system can be used to simultaneously monitor the performance and efficiency of a number of different hydro-diesel engines (for example, in a fleet or any other collection of vehicles).

In one particular use, the present system can be used to remotely shut down operation of the hydro-diesel portion of the engine should the vehicle's operator/user stop paying for the use of such hydro-diesel portion's increase in combustion efficiency. Alternately, the present system can be used to remotely shut down operation of the hydro-diesel portion of the engine should the hydro-diesel portion become unsafe to operate. A unique feature of the present system is that in such cases when the hydro-diesel portion has been shut down, the engine continues to operate as a standard diesel engine. Therefore, an important advantage of only shutting down the hydro-diesel portion of the engine system (thereby keeping the engine system operating as a standard diesel engine) is that the system remains safely operable by a user. Simply put, the vehicle is not incapacitated and unable to travel when its hydro-diesel components have been remotely turned off.

In other preferred aspects, the hydro-diesel components remain turned on, with the present system instead remotely adjusting their operation so as to achieve optimal efficiencies. For example, the present system may be used to keep constant pressure mixing of the hydrogen gas and the liquid diesel fuel over variable operating conditions.

Another important advantage of the present system is that it works with a large number of different hydro-diesel engines and configurations. For example, the present system can be used to monitor, adjust and (when desired) shut down hydro-diesel engine components that may optionally include reformers, oxygen concentrators, hydrogen tanks, hydrogen buffer tanks, oxygen tanks, oxygen buffer tanks, electrolysis systems (i.e.: for generating hydrogen and/or oxygen), and different hydrogen (and oxygen) infusers and mixers for generating homogeneous mixtures of hydrogen (and oxygen) in the liquid diesel fuel. Other gases may optionally be added as well to the hydrogen and diesel fuel infuser/mixer or into the combustion chamber.

In preferred aspects, the present system monitors and controls the operation of an engine system having both a standard diesel assembly and an added on hydro-diesel assembly (with the hydro-diesel parts of the assembly increasing overall system efficiency). In preferred aspects, the present system provides a system for remotely monitoring and controlling operation of a hydro-diesel engine, comprising:

(a) a diesel engine assembly, comprising:
  (i) a diesel engine,
  (ii) an injector for injecting liquid diesel fuel into the diesel engine,
  (iii) a liquid diesel fuel source, and
  (iv) a fuel pump for transporting liquid diesel fuel from the liquid diesel fuel source to the injector;

(b) a hydro-diesel assembly connected to the diesel engine assembly, wherein the hydro-diesel assembly comprises a hydrogen gas source, and wherein the hydro-diesel assembly is configured to mix hydrogen gas into the liquid diesel fuel to create a homogenized liquid/gas hydro-diesel fuel mixture;

(c) a monitoring system for monitoring operational characteristics of the hydro-diesel assembly; and (d) a remote control system for selectively turning on and off the operation of the hydro-diesel assembly, wherein the diesel engine assembly is operable both when the hydro-diesel assembly is operating and when the hydro-diesel assembly is not operating.

In preferred aspects, shutoff valves are provided upstream and downstream of the infuser. When these valves are opened, diesel fuel flow into the infuser (as hydrogen gas also flows into the infuser for mixing into the diesel fuel). When the infuser shutoff valves are closed, the diesel fuel instead flows directly into the fuel pump (with no hydrogen gas mixed therein). An additional shutoff valve can be included at the hydrogen source to shut off the flow of hydrogen to the infuser when the hydro-diesel portions of the engine have been shut down. Finally, a shutoff valve can be included between the diesel fuel source and the fuel pump to divert diesel fuel into the infuser when the hydro-diesel portions of the engine have been turned on.

In preferred aspects, the monitoring system measures operational characteristics of both the underlying diesel engine assembly and the "add-on" hydro-diesel assembly (which operates to increase combustion efficiency). The present system can also determine whether these operational characteristic are within pre-determined safety parameters (and accordingly shut down operation of the hydro-diesel portion of the engine system if such operation becomes unsafe).

In other preferred aspects, system users specifically pay for the use of the hydro-diesel portion of their engines. As such, financial or payment data from these system users can be analyzed such that should the user stop paying for the use of the hydro-diesel system's increased combustion efficiency, the hydro-diesel portion of the engine system can be shut down remotely leaving the user with a fully operational standard diesel engine remaining. Once the user has started making their payments again, the hydro-diesel portion of the engine system can again be re-activated (such that the user will again see the benefits of high engine combustion efficiency). In other aspects, the present system shuts down operation of both the diesel and hydro-diesel portions of the engine should a dangerous condition such as an accident occur. This has the benefit of responding to the danger and preventing further damage from occurring (for example, preventing the spread of fuel or the escape of dangerous flammable gasses).

In optional aspects, the remote control system in the vehicle transmits the measured operational conditions of the engine to a remote computer system. Analysis of the operational conditions of the engine can be carried out by the remote computer system such that the present system may also adjust operation of the hydro-diesel and diesel portions of the engine system to achieve optimal efficiencies. In some optional aspects, the remote computer system may be at a central facility and it may even be simultaneously communicating with remote control systems in each of a fleet of different vehicles. As such, the present system may optionally compare the operational conditions of various engines in the fleet against one another to determine optimal or unsafe engine operating parameters. As such, the remote computer system may be used to simultaneously control the operation of a plurality of remote control systems disposed in a fleet of hydro-diesel vehicles.

In preferred aspects, the operation of the hydro-diesel assembly can be adjusted by comparing the operation of the hydro-diesel assembly to one of: (a) historical data from the hydro-diesel engine itself, or (b) operational data or historical data from other hydro-diesel engines in other vehicles.

In various preferred aspects, the operational characteristics of the engine systems can be measured by any one of the following sensors: a liquid flow sensor, a gas flow sensor, a vibration sensor, a pressure sensor, a fuel gage sensor, a gas gage sensor, and a temperature sensor. Also in various preferred aspects, the operation of the hydro-diesel assembly may be adjusted by any one of the following mechanisms: a liquid flow control, a gas flow control, a bypass valve control, a pressure control valve, a mechanical agitator, a gas pump, and a liquid pump.

As was stated above, the present remote control system can be used with a wide variety of different hydro-diesel systems. As such, the present mechanisms and systems used to shut down (or simply to adjust operation) of the hydro-diesel portion of the engine may include monitoring, adjusting and/or shutting down different systems in different embodiments of the hydro-diesel system. However, since the various hydro-diesel systems would all be expected to include hydrogen gas being homogeneously mixed into liquid diesel fuel, the present remote control system for selectively turning on and off the operation of the hydro-diesel assembly preferably includes at a minimum some form of shut-off valve or isolation system for the hydrogen gas source that prevents the hydrogen gas from mixing into the liquid diesel fuel.

In some optional embodiments, the hydro-diesel assembly may comprise a hydrogen reformer system for extracting hydrogen gas from the liquid diesel fuel source and injecting the extracted hydrogen gas back into the liquid diesel fuel prior to the liquid diesel fuel entering an infuser/mixer. In these embodiments, the remote control system for selectively turning on and off the operation of the hydro-diesel assembly preferably comprises a shut-off valve that can be used for turning off diesel fuel flow into the hydrogen reformer, or for turning off hydrogen gas flow coming out of the hydrogen reformer, or both. These preferred embodiments having a reformer may also optionally also include a hydrogen buffer tank for receiving the hydrogen gas extracted by the reformer, with the hydrogen buffer tank being positioned between the reformer and the infuser/mixer.

In other optional embodiments, the hydrogen gas source may include a hydrogen tank or an electrolysis system. If an electrolysis system is used, it may be used to generate oxygen for the engine as well as hydrogen for the engine. In its various embodiments, the infuser/mixer which mixes hydrogen (and optionally oxygen and/or other gasses as well) into the liquid diesel fuel may comprise at least one of: a passive agitation system within the infuser/mixer, an active agitation system for vibrating the infuser/mixer, or a heating system for raising temperatures in the infuser/mixer. In such embodiments, the remote control system for selectively turning on and off the operation of the hydro-diesel assembly may comprise: a system for isolating hydrogen and oxygen gas flow into the infuser/mixer, a system for stopping vibration of the infuser/mixer, or a system for stopping the heating of the infuser/mixer.

In various other optional embodiments, the hydro-diesel assembly further comprises an oxygen gas source, with the oxygen gas from the oxygen source being mixed with the hydrogen gas in any one of the following locations: (i) within the infuser/mixer, (ii) upstream of the infuser/mixer, (iii) downstream of the infuser/mixer, or (iv) when entering the diesel engine itself. In some preferred embodiments, the oxygen gas source may be an oxygen concentrator. An oxygen concentrator is a device that receives ambient air therein and then removes nitrogen from the ambient air such that it then outputs concentrated oxygen. In various embodiments, this concentrated oxygen may either be mixed with the hydrogen gas upstream of an infuser/mixer, or be directly inputted into the diesel engine. In such aspects, the remote control system for selectively turning on and off the operation of the hydro-diesel assembly may comprise an oxygen gas flow valve for stopping the oxygen gas coming from the oxygen concentrator from either mixing with the hydrogen gas, or directly entering into the diesel engine (depending upon the placement of the oxygen concentrator within the overall system). In preferred embodiments, the system may also include an oxygen exhaust buffer tank, and an oxygen return line passing out of the diesel engine exhaust through the oxygen exhaust buffer tank and back into the diesel engine. A return line for passing uncombusted diesel from the diesel engine back into the liquid diesel fuel source may also be included.

DETAILED DESCRIPTION OF THE FIGURES

Conceptually, the present system includes the core components of a typical or standard diesel engine assembly with a variety of hydro-diesel engine components added thereto. These various hydro-diesel components dramatically increase the combustion efficiency of the diesel engine. The present system is specifically enabled to monitor and adjust the performance of the various hydro-diesel components of the system. In addition, the present system is specifically enabled to turn on or off the various hydro-diesel components while still permitting the present system to operate like a standard diesel engine when the various hydro-diesel components are turned off. As will be illustrated in FIG. 2, the present system for turning on and off the various hydro-diesel components can be used with a very wide variety of different hydro-diesel components and systems.

Figure 1:
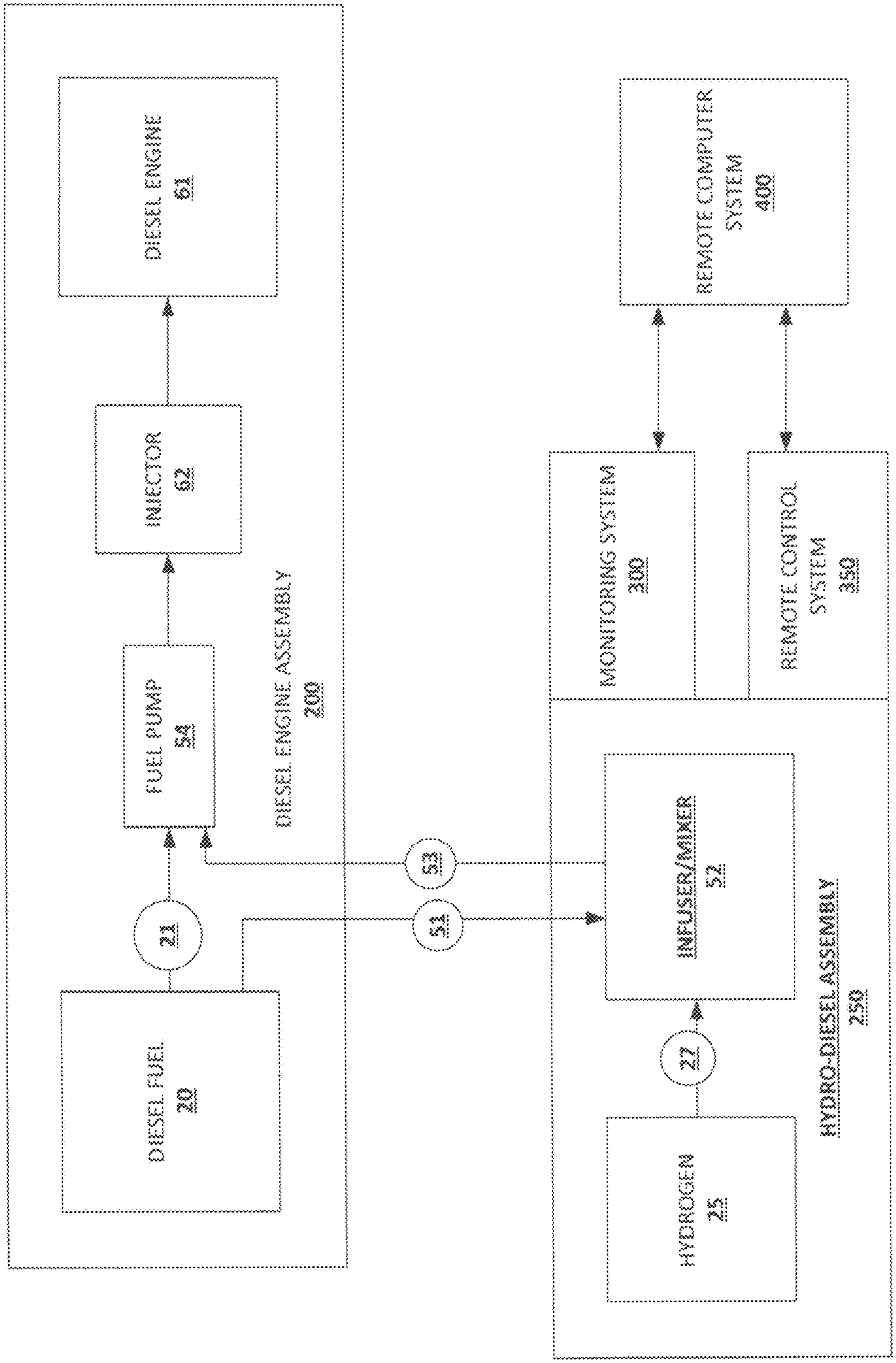
FIG. 1 is a schematic illustration showing operation of the present system.
Figure 2:
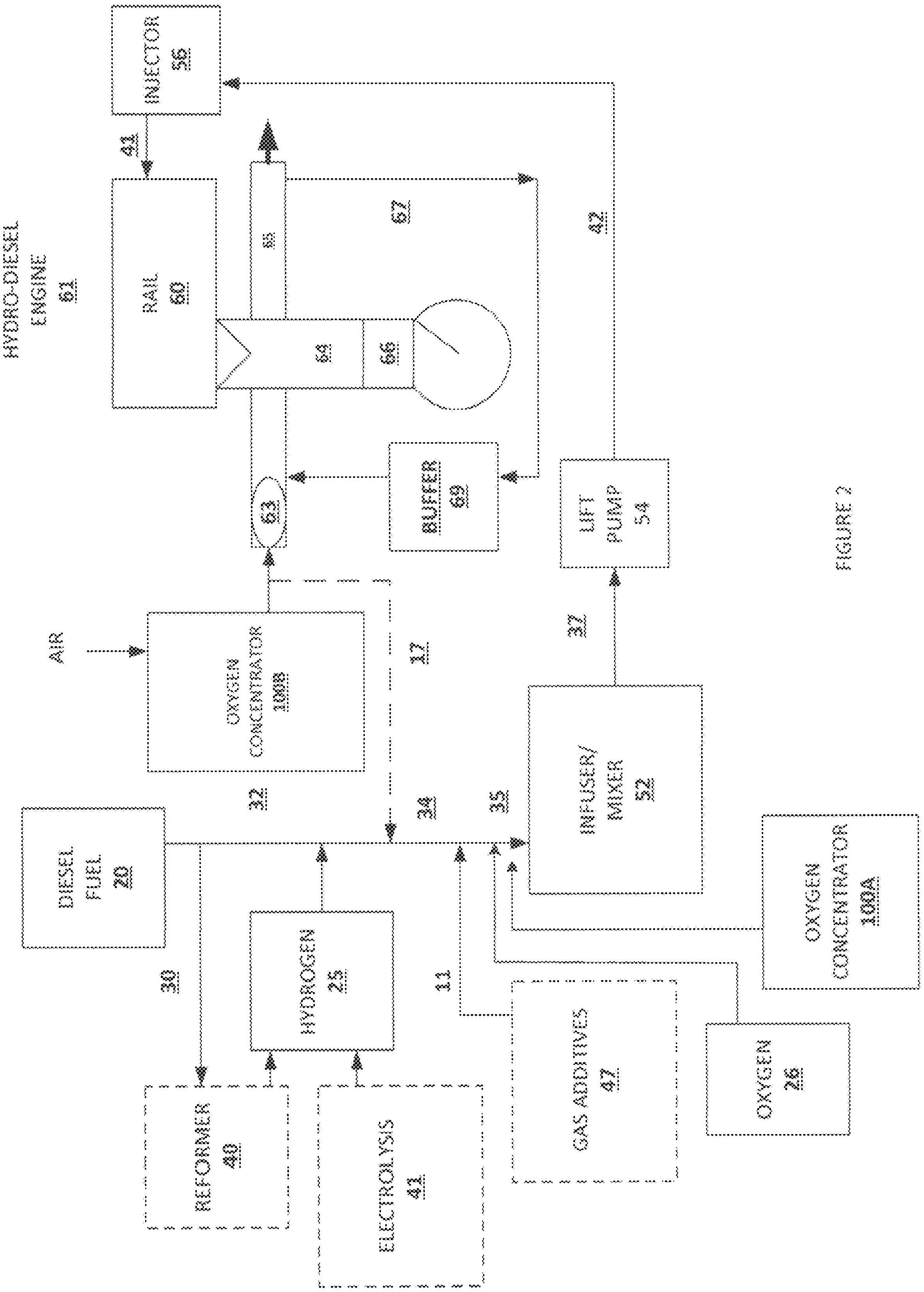
FIG. 2 is an illustration showing a variety of different optional hydro-diesel systems that may all be used together with the present engine monitoring and remote control system.

Therefore, for ease of understanding, FIG. 1 shows a schematic illustration of the operation of the present system in a general and simplified hydro-diesel case. FIG. 2 expands upon FIG. 1 by illustrating a wide variety of different optional hydro-diesel components and systems that all may be used together with the present system. It is to be understood that the particular hydro-diesel components being used may contain some or all of the illustrated components, in different combinations and different configurations, all keeping within the scope of the present invention.

Referring first to FIG. 1, the present system provides a standard diesel engine assembly 200. In its simplest form, all standard diesel engine assemblies include a liquid diesel fuel source 20 which feeds fuel into a standard diesel engine 61. In addition, a fuel pump 54 is typically required to move the liquid diesel fuel from the source 20 through an injection pump and injector 62 and into the diesel engine 61. (It is to be understood that a standard diesel engine has many more components and parts, but they are omitted here for ease of understanding the illustration).

The second main system of the present invention is a hydro-diesel assembly 250. The objective of a hydro-diesel assembly is to mix hydrogen gas together with the liquid diesel fuel to create a homogeneous mixture that (when the mixture is combusted in diesel engine 61) will dramatically increase the combustion efficiency of the overall system. It is to be understood that the hydro-diesel assembly 250 is thus an "add-on" to a standard diesel engine. It is also to be understood that hydro-diesel assembly 250 includes a large number of components (some of which will be illustrated in FIG. 2, and some of which will be omitted here for ease of illustration and understanding).

The third main system of the present invention is monitoring system 300. Monitoring system 300 measures a variety of different operational parameters of the present hydro-diesel assembly 250. Examples of the various systems being monitored and the specific devices used for such monitoring will be provided herein.

The fourth main system of the present invention is remote control system 350. Remote control system 350 controls the operation of different parameters of the present hydro-diesel assembly 250. Examples of the various systems and components that may be used to control operation of the present hydro-diesel assembly 250 will be provided herein.

Lastly, the fifth main system of the present invention is remote computer system 400. Whereas systems 200, 250, 300 and 350 may all be located on or within the specific vehicle in which diesel engine 61 is located, remote computer system 400 may optionally be located at some remote facility and may even be hosted on a remote server, as desired. As will be explained, monitoring system 300 and remote control system 350 both communicate back and forth with remote computer system 400. Such communication will preferably be wireless. In operation, data about the operation of hydro-diesel system 250 that is gathered by monitoring system 300 may be transmitted to remote computer system 400 which then analyzes the data and then instructs remote control system 350 to either turn on or off hydro-diesel system 250 or to adjust its operation in real time.

In preferred aspects, the present system provides a system for remotely monitoring and controlling operation of a hydro-diesel engine, comprising:

(a) a diesel engine assembly, comprising:
 (i) a diesel engine,
 (ii) an injector for injecting liquid diesel fuel into the diesel engine,
 (iii) a liquid diesel fuel source, and
 (iv) a fuel pump for transporting liquid diesel fuel from the liquid diesel fuel source to the injector;
(b) a hydro-diesel assembly connected to the diesel engine assembly, wherein the hydro-diesel assembly comprises a hydrogen gas source, and wherein the hydro-diesel assembly is configured to mix hydrogen gas into the liquid diesel fuel to create a homogenized liquid/gas hydro-diesel fuel mixture;
(c) a monitoring system for monitoring operation of the hydro-diesel assembly; and
(d) a remote control system for selectively turning on and off the operation of the hydro-diesel assembly, wherein the diesel engine assembly is operable both when the hydro-diesel assembly is operating and when the hydro-diesel assembly is not operating.

In preferred aspects, monitoring system 300 measures operational characteristics of both the diesel engine assembly 200 and the hydro-diesel assembly 250. Preferably, monitoring system 300 determines whether the operational characteristics are within pre-determined safety parameters. Remote control system 400 preferably determines when to turn off the hydro-diesel assembly 250 based on the operational characteristics measured by the monitoring system 300. In one preferred aspect, remote control system 350 determines when to turn off hydro-diesel assembly 250 based on financial data received by the remote control system.

Also included are shutoff valves 51 and 53 upstream and downstream of the infuser/mixer 52. A hydrogen gas shutoff valve 27 and a diesel fuel shutoff valve 21 are also included. When the hydro-diesel portions of the engine are operational, shutoff valves 27, 51 and 53 are all opened and shutoff valve 21 is turned off. As such, the diesel fuel in tank 20 and the hydrogen gas in source 25 are both directed into the infuser/mixer 52 for mixing. The mixture then passes through open valve 53 into the fuel pump 54. Conversely, when the hydro-diesel portions of the engine are turned off, shutoff valves 27, 51 and 53 are all closed and shutoff valve 21 is opened. As such, only the diesel fuel from tank 20 is directed into fuel pump 54. As such, remote control system 350 opens and closes shutoff valves 25, 51, 53 and 21 under the direction of remote computer system 400.

Preferably, monitoring system 300 also transmits the measured operational characteristics to a remote computer system 400, and the remote computer system 400 simultaneously controls the operation of a plurality of remote control systems 350 in a fleet or other collection of hydro-diesel vehicles. Preferably as well, the remote control system 400 adjusts operation of the hydro-diesel assembly 250 to increase the efficiency of the hydro-diesel engine. The operation of the hydro-diesel assembly may also be adjusted by comparing the operation of the hydro-diesel assembly to one of: (a) historical data from the hydro-diesel engine, or (b) operational data from hydro-diesel engines in other vehicles.

In preferred aspects, the operational characteristics may be measured by any one of the following sensors: a liquid flow sensor, a gas flow sensor, a vibration sensor, a pressure sensor, a fuel gage sensor, a gas gage sensor, and a temperature sensor. In preferred aspects, the operation of the hydro-diesel assembly 250 may be adjusted by any one of the following mechanisms: a liquid flow control, a gas flow control, a bypass valve control, a pressure control valve, a mechanical agitator, a gas pump, and a liquid pump.

As seen in FIG. 2, the present hydro-diesel system will include a hydrogen gas source 25 and some form of infuser or mixer 52. A source or tank 20 of diesel fuel is also provided. The hydrogen from tank 25 is mixed with the diesel fuel in tank 20, resulting in a hydrogen/fuel mixture 34. The mixing of the hydrogen gas and the diesel fuel may be done in the infuser/mixer 52, immediately upstream of the infuser/mixer 52, or even with the hydrogen gas and diesel fuel entering at different locations on or in the infuser/mixer 52. In preferred aspects, the hydrogen gas in tank 25 is simply supplied by bottled hydrogen gas. In other optional aspects, however, the hydrogen in tank 25 can be supplied from other devices such as an optional electrolysis system 41 (shown in dotted lines) or from a hydrogen diesel fuel reformer 40 (also shown in dotted lines).

In optional embodiments, the infuser/mixer 52 may be any of the infusers/mixers described in Applicant's co-pending PCT Application PCT/US23/35695 (Publication No. WO 2024/091443), entitled METHOD AND DEVICES COMBINING DIESEL FUEL AND HYDROGEN GAS TO FORM A HOMOGENIZED LIQUID HYDRO-DIESEL FUEL, incorporated herein by reference in its entirety for all purposes.

In other optional embodiments, oxygen gas may be supplied into the system through various means. In one embodiment, an optional oxygen tank 26 is provided. Oxygen tank 26 may be a stand-alone refillable oxygen tank, or oxygen could be supplied from electrolysis in optional electrolysis unit 41. In another embodiment, an optional oxygen concentrator 100A can be used to supply concentrated oxygen into infuser/mixer 52. In still other optional embodiments, an optional oxygen concentrator 100B can be used to supply oxygen into engine air intake 63, or (when optionally being combined with diesel fuel) through a carburetor.

In other optional embodiments, various gas additives such as air, oxygen and gaseous fuels may also be added at 47 to be mixed with the liquid diesel fuel from tank 20 and the hydrogen gas from tank 25 in infuser/mixer 52. Each of the reformer 40, electrolysis system 41, oxygen concentrators 100A or 100B, and gas additives 47 preferably are outfitted with on/off controls and shutoff valves, all under the control of remote control system 350 which is in turn under the control of remote computer system 400.

Optional oxygen concentrators 100A and/or 100B can be used to reduce the formation of the nitrous oxides producing a much more environmentally sensitive engine as follows. Oxygen concentrators are a known technology which are used for medical issues and for industrial uses. Oxygen concentrators remove upwards of 95% of the nitrogen from air which results in the oxygen concentration leaving the concentrator at upwards of 90%. With essentially no nitrogen from the ambient air entering the combustion chamber 66 there is minimal or no nitrogen in the combustion chamber to react with the oxygen during combustion. This advantageously results in minimal or no nitrous oxides being formed and vented to the environment with the exhaust gasses. Put simply, optional oxygen concentrator 100A or 100B can be used to provide concentrated oxygen into combustion chamber 66 such that the percentage of oxygen eventually received into the combustion chamber is higher than would be the case if only ambient air were used instead. The present optional use of an oxygen concentrator thereby significantly reduces the amount of nitrous oxide pollution released by the engine.

In preferred aspects, the oxygen concentrator 100A or 100B receives ambient air and removes a substantial portion of the nitrogen from the received ambient air to produce a flow of concentrated oxygen. The flow of concentrated oxygen from concentrator 100B can optionally be fed directly through an intake valve 63 into combustion chamber 66. This can be done at a sufficiently high flow volume such that an adequate volume of concentrated oxygen gas meets the oxygen demands of the engine. In optional aspects, an auxiliary oxygen buffer tank (not shown, but similar to oxygen tank 26) can be included to store a quantity of oxygen such that sufficient oxygen is available to the engine when a momentary oxygen demand (or reduced demand) is experienced such as during immediate acceleration or deceleration. In addition, auxiliary gas intake devices, including but not limited to filters, blowers, etc. can all be included as desired components within the scope of the present system.

In additional optional embodiments, the exhaust gasses 67 from the combustion chamber 66 may even be re-directed back into combustion chamber 66. This may occur, for example, when the quantity of oxygen that is required for system operation is less than the amount of concentrated oxygen gas being delivered from the oxygen condenser to the combustion chamber; for example, during operation where demands on the engine are low. At these times, not all of the oxygen delivered to the combustion chamber will be fully combusted in the combustion reaction. Accordingly, by diverting the exhaust gasses back into the combustion chamber, unused oxygen in the exhaust gas can be used again. In addition, any $CO_2$ in the exhaust gasses that is diverted back into the intake of the combustion chamber 66 will be non-reactive and simply pass through the system. Flow data may optionally be collected and flow valves maintained by a controller to insure the proper $CO_2$ flows volumes are added or reduced when passed to the gaseous intake port of the combustion chamber for optimum combustion efficiency. In an optional embodiment, an exhaust buffer tank 69 (shown in dotted lines) may be used to provide a storage buffer for the exhaust gasses to accommodate the demands of combustion chamber 66. For example, when the volume of gasses returning to the combustion chamber needs to be periodically adjusted. In further optional embodiments, the entry of $CO_2$ into the combustion chamber 66 is adjusted such that the amount of added $CO_2$ gas is managed such that the combined volume of gas and fuel within combustion chamber 66 when exposed to compression is sufficient to spontaneously combust. In further optional embodiments, non-reactive gasses 47 such as helium can be added to the combustion chamber to manage the intake gas volume demands while managing the oxygen concentration demands. In addition and in lieu of using concentrated oxygen, the present invention also includes using bottled oxygen or oxygen derived from the electrolysis system 41's separation of oxygen from water as the intake gas. In addition, the concentration and volume of oxygen passed into the combustion chamber can be managed by diverting a portion of the exhaust, including its $CO_2$ component, for combination with the concentrated oxygen to provide an optimum oxygen concentration and volume without further contributing to the formation of noxious gases.

Preferably, the concentrated oxygen is supplied into combustion chamber 66 by an oxygen concentrator 100A or 100B that extracts nitrogen from ambient air such that a substantial decrease of nitrogen and an increase of concentration of oxygen is fed into the combustion chamber. Most preferably, the concentrated oxygen has a concentration of greater than 50% and preferably greater than 80% and the decrease of nitrogen is lower that 25% and preferably lower that 10%. The concentrations and volumes are manageable by the concentration and volume of non-reactive gas, such as $CO_2$, that is added to the gaseous intake.

By optionally using such a source of concentrated oxygen, the oxygen concentration is increased from that available in ambient air. By increasing the concentration of oxygen, the concentration of nitrogen, which is found in ambient air, is reduced. The result is that less nitrous oxides are produced by the combustion, resulting in less pollution. As such, by supplying an increased concentration of oxygen to the combustion chamber, combustion efficiency is increased at the same time that pollution is decreased.

In optional aspects, oxygen concentrator 100B is used to concentrate oxygen gas from the ambient air such that an increased percentage of oxygen can be added directly to the air intake 63 into combustion chamber 66. A portion of the concentrated oxygen gas 17 can optionally be passed directly into the diesel fuel line at, for example, 34 where is combines with the diesel fuel and is then homogenized with hydrogen gas (and optionally other gaseous additives 47 in the infuser/mixer 52 for ultimate injection with the diesel fuel back into the combustion chamber 66.

Air is drawn from optional oxygen concentrator 100B through air intake 63. The concentrator 100B substantially removes nitrogen resulting in a high concentration of oxygen gas. The concentrated oxygen gas is passed into the combustion chamber 66 through gas intake 63 on the piston's 64 downward movement. The piston 64 then starts it upward movement compressing the mixture of concentrated oxygen gas. The hydro-diesel fuel is injected under high pressure by injector 62 after the piston 64 has compressed the concentrated oxygen within the combustion chamber 66. The piston 64, on its outward movement, compresses the oxygen within the combustion chamber 66 resulting in the oxygen being heated to a sufficiently high temperature to spontaneously combust the hydrogen-fuel mixture injected therein by injector 62. The exhaust gases leave the combustion chamber via exhaust output 65. Since these exhaust gases are formed in a nitrogen free (or substantially reduced nitrogen gas concentration) environment, they contain substantially reduced volumes of nitrous oxides. This results in improved internal combustion engine emissions. In optional embodiments, concentrated oxygen from concentrator 100B is passed through an optional carburetor which adds diesel fuel to the oxygen for further transfer into the combustion chamber 66 during the engine's intake cycle.

In other optional embodiments, an oxygen concentrator 100A may be used as the source of gaseous oxygen for use in the hydro-diesel engine. Optional oxygen concentrator 100A can be used to concentrate oxygen gas from the ambient air such that an increased percentage of oxygen can be added directly to the hydrogen-fuel mixture to form an oxygen-hydrogen-fuel mixture at 35. The hydrogen gas and the oxygen gas are preferably added to the diesel fuel by atomizing injection into the fuel to generate small gaseous bubbles.

As described above, oxygen condensers 100A and/or 100B are optional components of the present hydro-diesel assembly. Oxygen Concentrators come in many different configurations, and the present system is not limited to any one form of oxygen concentrator. Oxygen concentrators are used to provide oxygen rich air for patients having various medical conditions or for various industrial applications.

One example of an oxygen concentrator that is suitable with the present system is found in U.S. Pat. No. 8,377,180. This reference is incorporated herein by reference. This oxygen concentrator is a pressure swing adsorption-type (PSA-type) oxygen concentrator, which produces a highly concentrated oxygen gas by introducing compressed air from a compressor into an adsorption cylinder filled with an adsorbent such as zeolites and the like selectively adsorbing a nitrogen gas to eliminate selectively a nitrogen gas in the air. First, compressed air is supplied by a compressor into an adsorption cylinder to adsorb a nitrogen gas contained in air by an adsorbent such as zeolites and the like. The oxygen concentration in air is increased by selective adsorption and elimination of a nitrogen gas. A small amount of concentrated oxygen gas may also be supplied into the adsorption cylinder to promote the desorption of nitrogen. Thus, highly concentrated oxygen-enriched air having an oxygen concentration as high as 95% may be obtained from air by repeatedly pressurizing and depressurizing the adsorption cylinder using the PSA-type oxygen concentrator.

Other examples of oxygen concentrators that are suitable with the present system use zeolites to absorb nitrogen. Examples of such systems are found in U.S. Pat. Nos. 11,247,014; 9,884,162 and 6,478,857. These references are also incorporated herein by reference. Other examples of oxygen concentrators that are suitable with the present system include oxygen concentrators that use membrane gas separation to separate (and remove) the nitrogen in the atmosphere, thereby increasing the percentage of oxygen in the air coming out of the concentrator. It is to be understood that the present system encompasses any and all types and systems of oxygen concentrators without limitation.

In preferred aspects, oxygen concentrators 100A or 100B uses ordinary air as its input which has an oxygen concentration of around 22% and nitrogen of about 75%. In preferred aspects, the present oxygen concentrator 100A or 100B therefore removes upwards of 90% of the nitrogen which results in a concentrator output of about 95% oxygen. Such a 95% concentration of oxygen is more than sufficient for the oxygen additive from the concentrator to provide essentially the same engine efficiency as using a 100% oxygen source. A further benefit of the present system is that there is no need to carry a primary source for the oxygen (i.e.: bottled oxygen or pure water for an optional electrolysis system 41 which could input oxygen to the infuser 52). Instead, the input to concentrator 110A or 100B is open and freely available ambient air. This avoids the costs of having to continuously replenish the oxygen gas source during system operation.

In those preferred embodiments where the hydro-diesel assembly includes an oxygen gas source, the remote control system 350 preferably comprises a system for preventing the oxygen gas from being mixed with the hydrogen gas: (i) in an infuser/mixer 52, (ii) upstream of the infuser/mixer 52, (iii) downstream of the infuser/mixer 52, or (iv) when entering the diesel engine 61.

In those embodiments where the hydro-diesel assembly includes an oxygen concentrator 100A or 100B, the remote control system 350 preferably comprises a shutoff valve system for preventing the oxygen gas from being mixed with the hydrogen gas upstream of the infuser/mixer 52, or a shutoff valve system for preventing the oxygen gas from being directly inputted into the diesel engine 61.

If an optional diesel fuel reformer 40 is used, diesel fuel leaves tank 20, and a first portion 30 will be directed into reformer 40 (which will extract hydrogen from the diesel fuel while a second portion 34 passes through). The optional use of reformer 40 provides real time refinement of hydrogen from the liquid diesel fuel from tank 20 using hydrogen reformer technology. Specifically, the present system optionally uses the on board source diesel fuel in tank 20, (which is nominally and abundantly available within the vehicle or power generator) as the source of the hydrogen gas. Many variations of diesel fuel reformer technology are known for adaption and use, alone or in combination, and are encompassed herein as alternative systems for generating the needed hydrogen gas. One advantage of the present system of using diesel fuel for generating reformed hydrogen gas is that it reduces the infrastructure required as compared to other hydrogen source generators. Those skilled in the art are capable of adapting the present equipment and techniques of generating reformed hydrogen from one or more reformer technologies. In short, the present invention is thus directed to the new and novel structure of providing a diesel reformer as the hydrogen source for a hydro-diesel engine.

In preferred aspects, the present reformer 40 increases the efficiency of diesel fuel combustion by extracting hydrogen gas from a liquid diesel fuel source 20 and then mixing the extracted hydrogen gas back into the liquid diesel fuel at 35 before sending the resulting mixture into combustion chamber 66.

In a preferred aspects, the reformer technology adapts any one of: (i) a steam reforming system (in which hydrocarbons are reacted with water such that produced hydrogen can be stored and waste carbon dioxide released to the atmosphere), (ii) a partial oxidation reforming system (in which an air-fuel mixture is only partially combusted in a reformer), or (3) plasma reforming technologies, for example, dielectric barrier discharge (DBD) reactors, pulsed plasma reactors, gliding arc plasma reactors, and microwave (MW) plasma reactors. These technologies are known and those skilled in the art are capable of optimizing which reformer technique of combinations of techniques is best suited for particular applications. The present system is directed to combining these technologies with the hydro-diesel engine for improved, simplified and cost effective operation of the engine.

One advantage of the present optional reformer system 40 is that it reduces greenhouse and noxious gas emissions (due to the burn being more efficient). Another advantage of using a reformer is that it is energy efficient. Yet another advantage of using reformer 40 is that it is relatively inexpensive.

Preferably, in accordance with the present system, the mixing of reformed hydrogen back into the diesel fuel to form a gas/fuel mixture 34 is carried out by bubble injecting the hydrogen gas into the liquid diesel fuel then infusing (mixing) the combination to form a homogenous mixture of hydrogen in liquid diesel fuel. This system is pressurized, for example by lift pump 54, to compress the hydrogen gas bubbles distributed throughout the diesel fuel.

The mixture of hydrogen gas in liquid diesel fuel injected into the combustion chamber 66 via the injector pump 56 may optionally be at 10,000 to 50,000 psi, or more preferably 20,000 to 40,000 psi passing the fuel mixture into the common rail 60. Air is drawn into the combustion chamber 66 on the piston's 64 inward movement. The piston 64 then starts it outward movement compressing the gas air mixture within the chamber 66. The homogenized mixture of hydrogen gas and diesel fuel is atomizedly injected into the combustion chamber 66, when the piston 64 position at or about top dead center, via injector 62. The chamber 66 at this point is at a much reduced pressure of 200 to 1,000 psi or more preferably 500 to 800 psi, permitting the minute hydrogen bubbles in the homogenized mixture of hydrogen and diesel fuel to immediately and violently expand and increase in size causing great agitation and distribution of the diesel fuel disrupted into minute droplets throughout the chamber. The piston 64, on its outward movement, compresses the air within the chamber resulting in heated air sufficient to spontaneously combust the particulate diesel fuel and hydrogen gas.

Reformer 40 may optionally be connected to a hydrogen buffer tank 25. Buffer tank 25 allows the present system to maintain a continuous hydrogen supply should there be an immediate increase or slowdown in the hydrogen required by the infuser. In addition, reformer 40 may be positioned to be heated by the exhaust of the engine. Such heating facilitates the reforming reaction. In one preferred aspect, the chemical reaction in the reformer is:

$$CH4+\frac{1}{2}O2 \rightarrow CO+2H2$$

There are several different approaches and technologies for reforming hydrogen gas from diesel fuels. For example, these include steam reforming and partial oxidation reforming, and autothermal reforming (which combines features of both steam reforming and partial oxidation systems). In autothermal reforming, a hydrocarbon feed is reacted with both steam and air to produce a hydrogen-rich gas. Both the steam reforming and partial oxidation reactions take place. With the right mixture of input fuel, air and steam, the partial oxidation reaction supplies all the heat needed to drive the catalytic steam reforming reaction. This makes autothermal reformers simpler and more compact than steam reformers. Autothermal reformers typically offer higher system efficiency than partial oxidation systems, where excess heat is not easily recovered.

In one exemplary system illustrated in U.S. Patent Publication 2015/0136047 entitled "Mixed-Mode Combustion Methods Enabled by Fuel Reformers and Engines Using the Same", incorporated herein by reference in its entirety, a suitable autothermal reformer for use in accordance with the present system is shown. This system uses an atomizer with a rotating arm, to produce ultrafine atomization of diesel fuel through leveraging the high pressure produced by the centrifugal forces of the rotating arm. This system addressed the problem of diesel fuel being generally difficult to vaporize, therefore requiring high temperatures which can lead to pyrolysis and coking (carbonaceous deposits).

In another exemplary system illustrated in U.S. Pat. No. 10,815,123 entitled "Engine Fuel-Reforming Reactors, Systems, and Methods" a reforming reactor within the exhaust gas manifold operates as a heat exchanger to promote the reforming process.

In another exemplary reformer system, illustrated in U.S. Pat. No. 6,641,625, entitled "Integrated Hydrocarbon Reforming System and Controls" an autothermal reformer having distinct Zones for partial oxidation reforming and for steam reforming is provided.

In another exemplary reformer system, illustrated in U.S. Pat. No. 6,804,950, entitled "Plasma Reforming and Partial Oxidation of Hydrocarbon Fuel Vapor to Produce Synthesis Gas and/or Hydrogen Gas", a reformer is used to generate hydrogen gas that is sent straight into the combustion chamber.

In another exemplary reformer system, illustrated in U.S. Pat. No. 7,946,258, entitled "Method and Apparatus to Produce Enriched Hydrogen with a Plasma System for an Internal Combustion Engine", a reformer is also used to generate hydrogen gas that is sent straight into the combustion chamber.

In another exemplary reformer system, illustrated in U.S. Pat. No. 9,388,749, entitled "System and Method for Improving Performance of Combustion Engines Employing Primary and Secondary Fuels", a reformer is also used to generate hydrogen gas that is sent straight into the combustion chamber.

Yet another suitable example of reformer technology is found in U.S. Pat. No. 10,920,717, entitled "Hydrogen Producing System and Device for Improving Fuel Efficiency and Reducing Emissions of Internal Combustion and/or Diesel Engines". This system, however, simply injects the reformed hydrogen into the combustion chamber through the air intake.

Yet another suitable example of reformer technology is found in U.S. Pat. No. 11,239,479 entitled "Ignition Method of Fuel Reformer Using Partial Oxidation Reaction of the Fuel for SOFC Fuel Cell Start-up" which reforms hydrogen for use in a fuel cell.

Steam reforming involves exposing a mixture of steam and hydrocarbon fuel to a suitable catalyst at a high temperature. The catalyst used is typically nickel and the temperature is usually between about 700° C. and about 100° C.

Another conventional method of reforming a gaseous or liquid hydrocarbon fuel is partial oxidation (POX) reforming. In these processes a mixture of the hydrocarbon fuel and an oxygen containing gas are brought together within a POX chamber and subjected to an elevated temperature, preferably in the presence of a catalyst. The catalyst used is normally a noble metal or nickel and the high temperature is normally between about 700° C. and about 1200° C. for catalyzed reactions, and about 1200° C. to about 170° C. for non-catalyzed reactions.

The catalytic partial oxidation reforming technique is simpler than the catalytic Steam reforming technique, but is not as thermally efficient as catalytic Steam reforming. An additional known method of reforming a hydrocarbon fuel is by autothermal reforming, or “ATR”. An autothermal reformer uses a combination of Steam reforming and partial oxidation reforming. Waste heat from the partial oxidation reforming reaction is used to heat the thermally Steam reforming reaction. An autothermal reformer may in many cases be more efficient than either a catalytic Steam reformer or a catalytic partial oxidation reformer.

Yet another suitable example of reformer technology is found in U.S. Pat. No. 10,920,717, entitled “Hydrogen Producing System and Device for Improving Fuel Efficiency and Reducing Emissions of Internal Combustion and/or Diesel Engines”. This system, however, simply injects the reformed hydrogen into the combustion chamber through the air intake.

Yet another suitable example of reformer technology is found in U.S. Pat. No. 11,239,479 entitled “Ignition Method of Fuel Reformer Using Partial Oxidation Reaction of the Fuel for SOFC Fuel Cell Start-up” which reforms hydrogen for use in a fuel cell.

If an alternative electrolysis system 41 is used instead of or with other hydrogen generation systems as described herein, the electrolysis system 41 generates hydrogen by electrically splitting water molecules into its components of hydrogen and oxygen. The generated hydrogen can be collected in hydrogen tank 25. Pursuant to either method of generating hydrogen, the hydrogen is combined with the fuel to form a hydrogen-fuel mixture at 34.

The homogenized mixture of gaseous additives and diesel fuel at 37 is then passed to common rail 60 by injection pump 56 through line 42. The high pressure homogenized gaseous additives and fuel mixture is then injected into combustion chamber 66 in engine 61 by injector 62. In any of the above cases, and in accordance with the present system, the mixing of hydrogen into the diesel fuel to form a gas/fuel mixture is carried out by injecting bubbles of hydrogen gas into the liquid diesel fuel and mixing other preselected gaseous additives 47, as desired. The gaseous additives-oxygen-hydrogen-diesel fuel mixture is thoroughly mixed by mixer/infuser 52 to form a homogenous mixture of gaseous additives-oxygen-hydrogen homogeneous gas bubbles in liquid diesel fuel at 37. Next, the mixture is optionally pressurized to thereby compress the gas bubbles distributed throughout the diesel fuel by, for example by lift pump 54 and ultimately by injection pump 56 whereby such pressure substantially reduces the size of the gas bubbles in the fuel mixture in line 42.

The homogenized mixture of hydrogen gas and diesel fuel and oxygen is then passed to common rail 60 by injection pump 56 through line 43. The high pressure homogenized hydrogen/fuel mixture is then injected into combustion chamber 66 in engine 61 by injector 62. Ambient air is drawn into the combustion chamber 66 on the piston’s 66 inwardly movement. From the common rail 60, the high pressure homogenized oxygen-hydrogen-fuel mixture is atomizedly injected into the combustion chamber 66 via the injectors 62 as the piston 64 reaches top dead center. The combustion chamber 66 at this point is at a much lower pressure than the injected fuel mixture, permitting the minute hydrogen and oxygen bubbles in the homogenized mixture to immediately and violently expand and increase in size causing great agitation and forcing the immediate disruption and distribution of the diesel fuel into minute droplets throughout the combustion chamber 66. The piston 64, on its outward movement, compresses the air within the combustion chamber 66 resulting in heated air having a sufficiently high temperature to spontaneously combust the particulate fuel mixture when injected therein.

A further consequence of injecting the oxygen/hydrogen fuel mixture into the combustion chamber 66 as part of the fuel mixture results an earlier combustion due to the lower flash point of hydrogen relative to diesel fuel. The lower hydrogen flash point causes the hydrogen to combust earlier which contributes to an earlier increase in heat causing the diesel fuel to ignite earlier and more completely. In addition, and because the diesel fuel has experience additional particulation with greater surface area, the diesel fuel experiences a more complete combustion and increase in energy release, thereby increasing the combustion efficiency.

In addition, the hydrogen within the oxygen/hydrogen fuel mixture is being infused and adsorbed into the structure of the hydrocarbons that are carried directly into combustion chamber 66 as compressed gaseous molecules or ionic hydrogen atoms with the injected fuel. It therefore does not carry the major shortcoming of air-intake induction of hydrogen into the combustion chamber, which effectively displaces (at stoichiometric conditions) combustion chamber air content (and the benefits of the oxygen).

As such, the hydrogen added during the infusion process is not merely mixed or blended. Through a sequence of chemical processes, the H ions chemically repack and are adsorbed into the molecular structure of the hydrocarbons forming a more combustible long chain hydrocarbon. At the heart of the hydro-diesel infusion system is the differential chemical reaction between the injected molecular hydrogen and the bonded hydrogen atoms of the various fractions of diesel fuel. The reaction may comprise several components: (a) the selective hydrogenolysis, or bond dissociation, of unsaturated double-bond aromatics, liberating an additional volume (approximately 2×) of hydrogen (i.e.: fractional changes): (b) the selective hydrogenation, or adsorption, of injected and liberated hydrogen atoms onto accessible carbon atoms in the single-bond long chain saturated isoparaffinics (i.e.: molar changes); and (c) the retention of a volume of liberated ionic hydrogen and injected hydrogen molecules in highly pressurized gaseous form, and thus immediately available in that form at the moment of flame propagation (i.e.: combustion changes). Therefore the hydrogen reaction process is another source of the observed fuel efficiency is a product of a significantly enhanced fuel combustion sequence.

Two principal sources of improved combustion efficiency can include: (a) the induced turbulence, spray, and distributional effects, and (b) the enhanced combustion physics, as follows.

(a) Enhanced Turbulence: The physics of sudden gaseous expansion of gaseous bubbles is a novel variable in the combustion equation, directly affecting the event in several ways. First, the kinetic gas expansion physically propels bubbles independently, thereby altering the spray configuration and, just prior to ignition, magnifying and compounding the normal, and desirable, boundary turbulence and distribution critical to complete fuel consumption, fuel efficiency, and minimization of unburnt exhaust emissions. At a minimum, the gaseous kinetics function to induce added expansive precombustion turbulence, ensuring a significant increase in surface area and, hence, high propagation speed and a sharp increase in cylinder pressure. The gaseous bubbles are also not burning in the same manner, or at the same time, or at the same place as the bonded gaseous bubbles. Their action, however, is directly affecting the expansion and stratification characteristics of flame propagation, increasing the surface area of the flame, the burn velocity, and the penetration of the burn throughout the chamber. The burn efficiency of the combustion event improves at each phase, from ignition initiation through bloom and decay. In sum, the gaseous bubbles, undergoing explosive expansion at a microscopic scale, combined with liberated ionic H atoms, are effecting a far more powerful, distributed, uniform, and enduring combustion event.

(b) Combustion Effects: The high inertial, heavy mass, diesel hydrocarbon molecule will naturally concentrate near the center of the injection spray, while the large, light weight, rapidly expanding, and suddenly slowing and mixing hydrogen gas molecule (and ionic H atoms) will migrate to the periphery of the spray. Given that the principal chemical transformation of combustion takes place along the thin jet interfacial (boundary) region separating the unburned and the burned gases, this sequence, in theory, places the hydrogen gas at the ideal place at the ideal moment of combustion. It is important to note that the free (not adsorbed) ionic hydrogen produced during the infusion process is more reactive than molecular hydrogen, further accelerating the combustion physics.

Infuser/mixer 52 has so far been described in general terms above. It is to be understood that the choice of a mixer (as opposed to using an infuser) can be a non-obvious choice to a person skilled in the art when the mixer has a novel geometry that provides non-obvious mixing benefits in a much smaller package as compared to a traditional infuser. Exemplary infuser/mixer 52 may be any of the infusers/mixers described in Applicant's co-pending PCT Application PCT/US23/35695 (Publication No. WO 2024/091443), entitled METHOD AND DEVICES COMBINING DIESEL FUEL AND HYDROGEN GAS TO FORM A HOMOGENIZED LIQUID HYDRO-DIESEL FUEL, incorporated herein by reference in its entirety for all purposes. In addition, the present use of an agitation system (either active or passive agitation) is also not seen in a traditional infuser. For example, the present mixer 52 may optionally comprise a cylindrical container having an entrance funnel and an exit funnel. In one particular embodiment, the infuser/mixer may preferably have a diameter between 2" and 8" and a length between 6" and 24", and the entrance funnel and exit funnel preferably have a length between 3" and 10". In preferred aspects, the present mixer's chamber diameter is from 10% to 75% of its length. This preferred dimension preferably offers unexpected mixing benefits in a comparatively small space.

In additional preferred embodiments, the mixing chamber may include a passive agitation structure such as internal baffles or ridges on the inner circumference of a mixing chamber in the mixer or flow disks across the interior of the mixing chamber with apertures passing therethrough. In other additional preferred embodiments, the mixing chamber may include an active agitation structure such as: a propeller, moveable mechanical fins, a vibration system, a heating system or a pressure enhancing such as a moveable diaphragm. Alternatively, a passive agitation structure such as internal baffles or ridges or flow disks having apertures passing therethrough can optionally be used on the inner circumference of the mixer.

In those embodiments where the hydro-diesel assembly includes an infuser/mixer, the remote control system preferably comprises: (a) a system for isolating hydrogen gas flow into the infuser/mixer 52, (b) a system for stopping vibration of the infuser/mixer 52, or (c) a system for stopping heating of the infuser/mixer 52.

It is to be understood that the presently disclosed systems are exemplary and that other suitable components and methods may also be used, as known to one skilled in the art, and that such components and methods are also understood to be encompassed within the scope of the present invention.

What is claimed is:

1. A system for selectively operating an engine either as a diesel engine or as a hydro-diesel engine, comprising:
- (a) a diesel engine assembly, comprising:
  - (i) a diesel engine,
  - (ii) an injector for injecting liquid diesel fuel into the diesel engine,
  - (iii) a liquid diesel fuel source, and
  - (iv) a fuel pump for transporting liquid diesel fuel from the liquid diesel fuel source to the injector;
- (b) a hydro-diesel assembly connected to the diesel engine assembly, comprising:
- a hydrogen gas source, and
- an infuser configured to mix hydrogen gas into the liquid diesel fuel to create a homogenized liquid/gas hydro-diesel fuel mixture;
- (c) a shutoff valve system, configured to either:
  - (i) permit the diesel fuel to be mixed with the hydrogen gas in the infuser and then return the homogenized liquid/gas hydro-diesel fuel mixture to the fuel pump, or
  - (ii) isolate the hydro-diesel assembly from the diesel engine assembly; and
- (d) a remote control system for selectively turning on and off the operation of the hydro-diesel assembly while the diesel engine assembly is operating.

2. The system of claim 1, wherein the remote control system turns off the hydro-diesel assembly based on financial data received by the remote control system.

3. The system of claim 1, wherein the remote control system simultaneously communicates with the remote control systems in a plurality of vehicles and is configured to turn off operation of the hydro-diesel assembly of each of the plurality of vehicles.

4. A system for selectively operating an engine either as a diesel engine or as a hydro-diesel engine, comprising:
- (a) a diesel engine assembly;
- (b) a hydro-diesel assembly connected to the diesel engine assembly;
- (c) a shutoff valve system for isolating the hydro-diesel assembly from the diesel engine assembly; and
- (d) a remote control system for selectively turning off the operation of the hydro-diesel assembly while the diesel engine is in operation.

5. The system of claim 4, further comprising:

(e) a remote computer system in communication with the remote control system, wherein the remote computer system is configured to instruct the remote control system to turn off operation of the hydro-diesel assembly.

6. The system of claim 5, wherein the remote computer system turns off operation of the hydro-diesel assembly based on financial data received from the remote computer system.

7. The system of claim 5, wherein the remote computer system simultaneously communicates with the remote control systems in a plurality of vehicles.

8. The system of claim 4, further comprising:

(f) a monitoring system for monitoring the operation of either or both of the hydro-diesel assembly or the diesel engine assembly.

9. The system of claim 8, wherein the monitoring system determines whether the operational characteristics are within pre-determined safety parameters.

10. The system of claim 4, wherein the hydro-diesel assembly comprises:

a hydrogen gas source, and an infuser/mixer, wherein the hydro-diesel assembly is configured to mix hydrogen gas into the liquid diesel fuel in the infuser/mixer to create a homogenized liquid/gas hydro-diesel fuel mixture.

11. The system of claim 10, wherein the shutoff valve assembly comprises:

a shutoff valve between the hydrogen gas source and the infuser/mixer, a shutoff valve between a diesel fuel source and the infuser/mixer, a shutoff valve between the infuser/mixer and a fuel pump, and a shutoff valve between the diesel fuel source and the fuel pump.

12. The system of claim 10, wherein the hydro-diesel assembly further comprises:

a hydrogen reformer system for extracting hydrogen gas from the liquid diesel fuel source and injecting the extracted hydrogen gas back into the liquid diesel fuel prior to the liquid diesel fuel entering the infuser/mixer.

13. The system of claim 10, wherein the hydro-diesel assembly further comprises:

an oxygen source configured to send concentrated oxygen into:

the infuser/mixer, or the combustion chamber.

14. The system of claim 10, wherein the hydro-diesel assembly further comprises:

a gas additives source configured to send gas additives into the infuser/mixer.

15. A system for selectively operating an engine either as a diesel engine or as a hydro-diesel engine, comprising:

(a) a diesel engine assembly;

(b) a hydro-diesel assembly connected to the diesel engine assembly, wherein the hydro-diesel assembly is configured to mix hydrogen gas into the liquid diesel fuel to create a homogenized liquid/gas hydro-diesel fuel mixture;

(c) a shutoff valve system for isolating the hydro-diesel assembly from the diesel engine assembly;

(d) a remote control system for selectively turning off the operation of the hydro-diesel assembly; and (e) a remote computer system for controlling operation of the remote control system.

16. The system of claim 15, wherein the remote computer system simultaneously controls the operation of a plurality of remote control systems in a fleet or collection of hydro-diesel vehicles.

17. The system of claim 15, wherein the remote control system adjusts operation of the hydro-diesel assembly to increase the efficiency of the hydro-diesel engine.

18. The system of claim 15, wherein the monitoring system comprises at least one of the following sensors:

a liquid flow sensor, a gas flow sensor, a vibration sensor, a pressure sensor, a fuel gage sensor, a gas gage sensor, and a temperature sensor.

19. The system of claim 15, wherein the hydrogen gas source is:

a hydrogen tank, a reformer, or an electrolysis system.

20. The system of claim 15, wherein the hydrogen gas and the liquid diesel fuel are mixed in an infuser/mixer and the infuser/mixer comprises at least one of:

a passive agitation system within the infuser/mixer, an active agitation system for vibrating the infuser/mixer, or a heating system for raising temperatures in the infuser/mixer.

* * * * *